(12) United States Patent
Schubert et al.

(10) Patent No.: US 12,555,457 B2
(45) Date of Patent: Feb. 17, 2026

(54) SYSTEMS AND METHODS FOR DETECTING ERROR IN ODOMETER READING

(71) Applicant: Ford Global Technologies, LLC, Dearborn, MI (US)

(72) Inventors: Jochen Schubert, Farmington Hills, MI (US); Bradley Warren Smith, Ann Arbor, MI (US)

( * ) Notice: Subject to any disclaimer, the term of this patent is extended or adjusted under 35 U.S.C. 154(b) by 135 days.

(21) Appl. No.: 18/435,612

(22) Filed: Feb. 7, 2024

(65) Prior Publication Data

US 2025/0252839 A1  Aug. 7, 2025

(51) Int. Cl.
  *G08B 21/18* (2006.01)
  *B60C 23/04* (2006.01)
  *G01C 22/00* (2006.01)

(52) U.S. Cl.
  CPC ........ *G08B 21/182* (2013.01); *B60C 23/0488* (2013.01); *G01C 22/00* (2013.01)

(58) Field of Classification Search
  None
  See application file for complete search history.

(56) References Cited

U.S. PATENT DOCUMENTS

| | | | |
|---|---|---|---|
| 5,924,057 A | 7/1999 | Kell | |
| 6,897,774 B2 * | 5/2005 | Costa | G08B 17/10 340/522 |
| 8,594,900 B2 | 11/2013 | Couch et al. | |
| 8,600,607 B2 * | 12/2013 | Kessler | B60C 23/0488 340/447 |
| 9,361,739 B2 | 6/2016 | Biondo et al. | |
| 9,539,901 B1 * | 1/2017 | Clauss | G01C 21/3697 |
| 11,605,977 B2 * | 3/2023 | Binder | A63B 43/06 |
| 12,307,885 B2 * | 5/2025 | Sadu | H04L 67/12 |
| 2018/0001869 A1 * | 1/2018 | Ur | G08B 21/182 |

(Continued)

FOREIGN PATENT DOCUMENTS

| | | | | |
|---|---|---|---|---|
| CN | 114347844 A | * | 4/2022 | B60L 53/80 |
| CN | 115535017 A | * | 12/2022 | B61F 5/38 |
| KR | 100413255 B1 | | 12/2003 | |

OTHER PUBLICATIONS

Eugen Horatiu Gurban, Risk Assessment and Security Countermeasures for Vehicular Instrument Clusters, 2018 48th Annual IEEE/IFIP International Conference on Dependable Systems and Networks Workshops (DSN-W), Luxembourg, Luxembourg, 2018, pp. 223-230, doi: 10.1109/DSN-W.2018.00068.

*Primary Examiner* — Fekadeselassie Girma
(74) *Attorney, Agent, or Firm* — Frank Lollo; Eversheds Sutherland (US) LLP (57) ABSTRACT

A vehicle including a first sensor, a second sensor and a processor is disclosed. The first sensor may be configured to measure first inputs associated with a vehicle wheel, and the second sensor may be configured to measure second inputs associated with the vehicle wheel. The processor may estimate a first distance travelled by the vehicle wheel for a predefined time duration on a vehicle trip based on the first inputs, and a second distance travelled by the vehicle wheel for the predefined time duration on the vehicle trip based on the second inputs. The processor may further calculate a difference between the second distance and the first distance, and perform a predefined action when the difference may be greater than a predefined threshold.

19 Claims, 4 Drawing Sheets

(56) References Cited

U.S. PATENT DOCUMENTS

| | | | |
|---|---|---|---|
| 2018/0086306 A1* | 3/2018 | Schmotzer | B60R 25/102 |
| 2022/0194295 A1* | 6/2022 | Dabaghi | G01V 3/10 |
| 2023/0050853 A1 | 2/2023 | Klausner et al. | |
| 2024/0012106 A1* | 1/2024 | Fasola | G01S 7/4026 |
| 2025/0093236 A1* | 3/2025 | Khan | G01M 17/02 |

* cited by examiner

SYSTEMS AND METHODS FOR DETECTING ERROR IN ODOMETER READING

FIELD

The present disclosure relates to systems and methods for detecting error in odometer reading by using vehicle Tire Pressure Monitoring System (TPMS) sensors.

BACKGROUND

Odometer fraud and tampering within a vehicle is a prevalent issue that affects vehicle buyers, vehicle original equipment manufacturers (OEMs), financial institutions, and/or the like. The manipulation of a vehicle's odometer reading compared to its true mileage can significantly affect both a vehicle's real and perceived value and reliability. Such practices may unfairly benefit a vehicle seller or lessee, while adversely affecting interests of a vehicle buyer and/or other parties performing vehicle valuation, assessment, etc.

One of the known methods of odometer tampering involves blocking of the wheel spin signals from the vehicle's speed sensors or ABS modules. This enables malicious users to hide the true mileage the vehicle has accumulated, thus causing the odometer to output incorrect (and reduced) mileage. Currently, there are limited means to detect such odometer tampering, and alert relevant parties (e.g., OEMs, financial institutions, vehicle buyers, etc.) of potentially incorrect odometer reading.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a vehicle that may facilitate in determining if an odometer reading associated with the vehicle may have been tampered or manipulated. The vehicle may include a wheel sensor or an ABS module, and one or more Tire Pressure Monitoring System (TPMS) sensors associated with vehicle tires. The wheel sensor may be configured to measure wheel spin data associated with each vehicle tire, and a vehicle odometer may be configured to determine a distance or mileage travelled/accumulated by the vehicle based on the wheel spin data received by the odometer from the wheel sensor. In some aspects, a malicious user may block one or more wheel spin data signals from reaching to the odometer, thereby causing the odometer to determine and output reduced and inaccurate mileage. The vehicle may use inputs measured by the TPMS sensors to detect such odometer reading manipulation.

In an exemplary aspect, the TPMS sensors may be configured to measure vehicle wheel rotation data and vehicle wheel spin timestamp data associated with each vehicle tire. The vehicle may be configured to estimate a first distance travelled by each vehicle tire for a predefined time duration on a vehicle trip based on the wheel spin data measured and transmitted by the wheel sensors to the odometer, and a second distance travelled by each vehicle tire for the same predefined time duration based on the vehicle wheel rotation data and the vehicle wheel spin timestamp data associated with each vehicle tire measured by the TPMS sensors. The vehicle may further compare the estimated first and second distances.

The vehicle may determine that an error instance may have occurred when a difference (e.g., a first difference) between the first distance and the second distance may be greater than a first predefined threshold. The vehicle may further monitor a count of such error instances on the vehicle trip, and may output an alert notification to a server and/or a user device (or set a Diagnostic Trouble Code (DTC)) when a ratio of the count of error instances and a time duration elapsed in the vehicle trip may be greater than a second predefined threshold. The alert notification/DTC may indicate to a vehicle original equipment manufacturer (OEM) that the odometer reading may be tampered, and further investigations may be required to ascertain the accurate mileage accrued by the vehicle.

The vehicle may additionally estimate a second total distance travelled by the vehicle on the vehicle trip based on the vehicle wheel rotation data and the vehicle wheel spin timestamp data measured by the TPMS sensors, when the vehicle trip ends. The vehicle may further obtain a distance/mileage (or a "first total distance") recorded by the odometer for the vehicle trip based on the wheel spin data received by the odometer from the wheel sensor. The vehicle may compare the first total distance with the second total distance, and may output another alert notification to the server and/or the user device (or set a DTC) when a difference between the second total distance and the first total distance may be greater than a third predefined threshold. The comparison of the first and second total distances at the end of the vehicle trip acts as another layer of detection for odometer reading fraud/tampering.

The present disclosure discloses a vehicle that determines if an odometer reading may be tampered or manipulated. The vehicle uses existing vehicle components to detect odometer reading fraud/tampering, thereby eliminating the need to use external and potentially complex systems for detecting odometer manipulation. Further, the alert notifications/DTCs set by the vehicle enable a potential vehicle buyer or a vehicle OEM to conveniently determine if the odometer reading may be accurate or inaccurate, and accordingly perform further actions.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
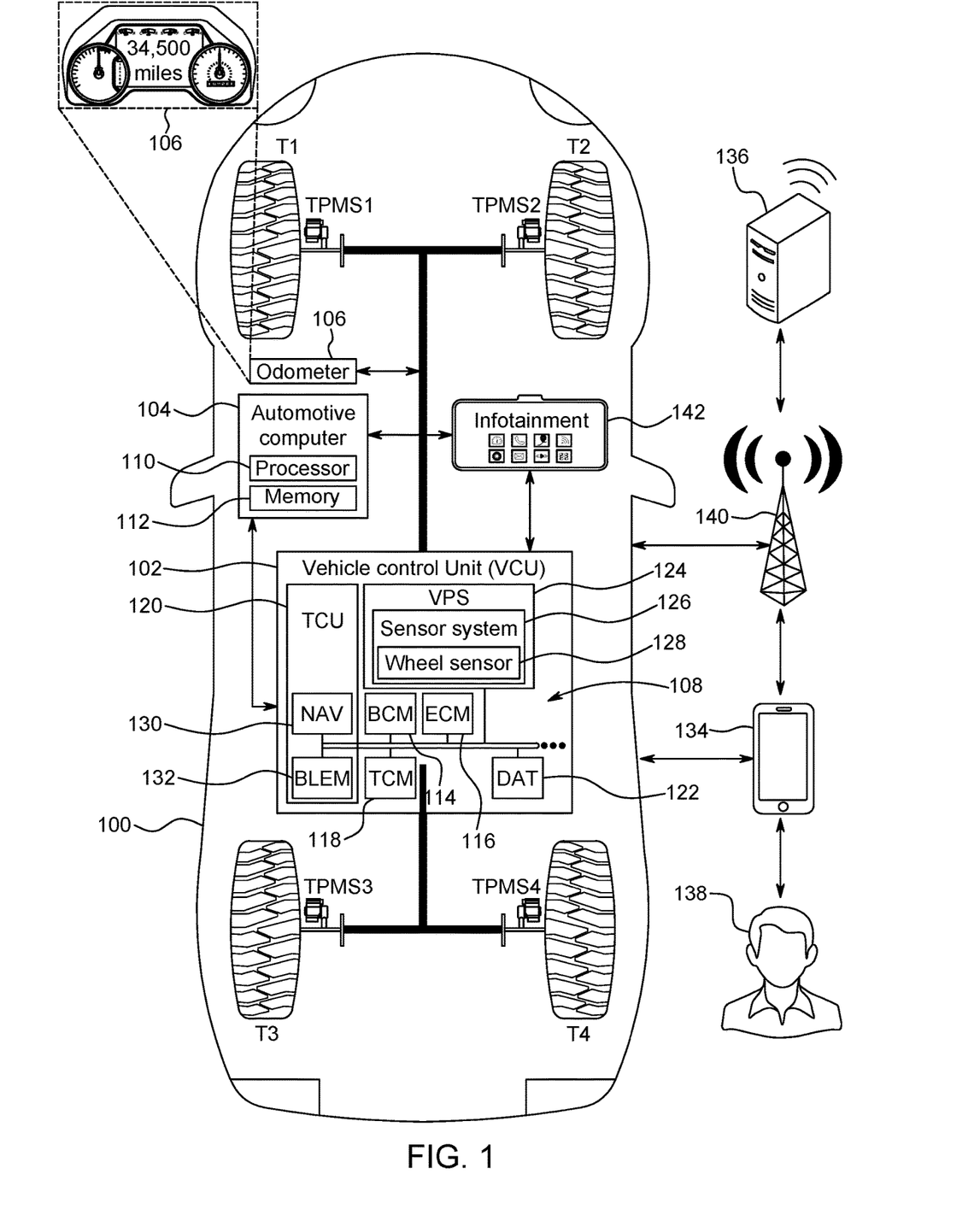
FIG. 1 depicts a block diagram of a vehicle in accordance with the present disclosure.

FIG. 1 depicts a block diagram of a vehicle 100 in accordance with the present disclosure. FIG. 1 will be described with continued reference to FIG. 2. The vehicle 100 may take the form of any passenger or commercial vehicle such as, for example, a car, a work vehicle, a crossover vehicle, a van, a minivan, etc. Further, the vehicle 100 may be a manually driven vehicle and/or may be configured to operate in a fully autonomous (e.g., driverless) mode or a partially autonomous mode, and may include any powertrain such as, for example, a gasoline engine, one or more electrically-actuated motor(s), a hybrid system, etc.

The vehicle 100 may include a plurality of components/units including, but not limited to, wheels/tires T1, T2, T3, T4, one or more tire pressure monitoring system (TPMS) sensors TPMS1, TPMS2, TPMS3, TPMS4, a vehicle control unit (VCU) 102, an automotive computer 104, an odometer 106, and/or the like. The VCU 102 may include a plurality of Electronic Control Units (ECUs) 108 disposed in communication with the automotive computer 104. The odometer 106 may be configured to output a total mileage (or travel distance) accumulated or travelled by the vehicle 100 throughout the vehicle lifetime. In accordance with the present disclosure, the vehicle 100 may be configured to determine whether the mileage reading output by (or displayed on) the odometer 106 is accurate or inaccurate, as described in detail later below.

In some aspects, each TPMS sensor may be associated with (and located in proximity to) one vehicle tire. For example, the TPMS1 may be associated with the tire T1, the TPMS2 may be associated with the tire T2, the TPMS3 may be associated with the tire T3, and the TPMS4 may be associated with the tire T4. The TPMSs1-4 may be configured to measure a tire pressure of the corresponding associated tire T1-T4. In some aspects, each TPMS1-4 may additionally include an accelerometer (not shown) that may detect/measure and broadcast the associated tire's wheel rotation data and wheel spin timestamp data. In some aspects, the TPMS1-4 may broadcast the tire's wheel rotation data and wheel spin timestamp data via wireless communication, e.g., via low frequency (LF), ultra-high frequency (UHF), Wi-Fi, Ultra-wideband (UWB), Bluetooth low energy (BLE), etc.

The automotive computer 104 may be installed anywhere in the vehicle 100, in accordance with the disclosure. The automotive computer 104 may be or include an electronic vehicle controller, having one or more processor(s) 110 and a memory 112. The processor 110 may be disposed in communication with one or more memory devices disposed in communication with the respective computing systems (e.g., the memory 112 and/or one or more external databases not shown in FIG. 2). The processor 110 may utilize the memory 112 to store programs in code and/or to store data for performing aspects in accordance with the disclosure. The memory 112 may be a non-transitory computer-readable storage medium or memory storing an odometer error detection program code. The memory 112 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 102 may share a power bus with the automotive computer 104 and may be configured and/or programmed to coordinate the data between vehicle systems, connected servers, and other vehicles (not shown in FIG. 1) operating as part of a vehicle fleet. The VCU 102 may include or communicate with any combination of the ECUs 108, such as, for example, a Body Control Module (BCM) 114, an Engine Control Module (ECM) 116, a Transmission Control Module (TCM) 118, a telematics control unit (TCU) 120, a Driver Assistances Technologies (DAT) controller 122, etc. The VCU 102 may further include and/or communicate with a Vehicle Perception System (VPS) 124, having connectivity with and/or control of one or more vehicle sensor system(s) 126. The vehicle sensor system 126 may include one or more vehicle sensors including, but not limited to, a vehicle wheel speed sensor 128 (or wheel sensor 128), a Radio Detection and Ranging (RADAR or "radar") sensor configured for detection and localization of objects inside and outside the vehicle 100 using radio waves, sitting area buckle sensors, sitting area sensors, a Light Detecting and Ranging ("lidar") sensor, door sensors, proximity sensors, temperature sensors, one or more ambient weather or temperature sensors, vehicle interior and exterior cameras, steering wheel sensors, a vehicle accelerometer, a vehicle gyroscope, a vehicle magnetometer, etc. In some aspects, the wheel sensor 128 may be an ABS sensor/module configured to measure wheel spin data associated with each tire T1-T4. The odometer 106 may be configured to determine/calculate a distance travelled by the vehicle 100 based on the wheel spin data (or "wheel spin ticks") measured by the wheel sensor 128.

In some aspects, the VCU 102 may control vehicle operational aspects and implement one or more instruction sets received from one or more connected user devices and/or servers, and/or from one or more instruction sets stored in the memory 112.

The TCU 120 may be configured and/or programmed to provide vehicle connectivity to wireless computing systems onboard and off board the vehicle 100 and may include a Navigation (NAV) receiver 130 for receiving and processing a GPS signal, a BLE® Module (BLEM) 132, a Wi-Fi transceiver, an ultra-wideband (UWB) transceiver, and/or other wireless transceivers (not shown in FIG. 1) that may be configurable for wireless communication (including cellular communication) between the vehicle 100 and other systems (e.g., a vehicle key fob, not shown in FIG. 1, a user device 134, one or more servers 136, etc.), computers, and modules.

In some aspects, the user device 134 may be associated with an operator 138, who may be, for example, an operator associated with a vehicle original equipment manufacturer (OEM), an operator associated with a financial institution, an operator associated with an entity that tracks odometer manipulation of a plurality of vehicles, and/or the like. The user device 134 may be, for example, a mobile phone, a tablet, a laptop, a computer, a wearable device, or any other device with communication capabilities. The server 136 may also be associated with a vehicle OEM, a financial institution, an entity that tracks odometer manipulation of a plurality of vehicles, and/or any other firm that may perform valuation or assessment of the vehicle 100.

In some aspects, the TCU 120 may enable wireless communication between the vehicle 100 and connected user devices (e.g., the user device 134), servers (e.g., the server 136), etc., via one or more networks 140. The network 140 illustrates an example communication infrastructure in which the connected devices discussed in various embodiments of this disclosure may communicate. The network 140 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the TCU 120 may be disposed in communication with the ECUs 108 by way of a bus.

The ECUs 108 may control aspects of vehicle operation and communication using inputs from human drivers, inputs from the automotive computer 104, and/or via wireless signal inputs/command signals received via the wireless connection(s) from other connected devices, such as the user device 134, the server 136, among others.

The BCM 114 generally includes integration of sensors, vehicle performance indicators, and variable reactors associated with vehicle systems and may include processor-based power distribution circuitry that may control functions associated with the vehicle body such as lights, windows, security, camera(s), audio system(s), speakers, wipers, door locks and access control, various comfort controls, etc. The BCM 114 may also operate as a gateway for bus and network interfaces to interact with remote ECUs (not shown in FIG. 2). In some aspects, the BCM 114 may perform the same functions/operations as the processor 110. In the present disclosure, all the operations described as being performed by the processor 110 may be performed by the BCM 114, and vice-versa.

The DAT controller 122 may provide Level-1 through Level-3 automated driving and driver assistance functionality that may include, for example, active parking assistance, vehicle backup assistance, and/or adaptive cruise control, among other features. The DAT controller 122 may also provide aspects of user and environmental inputs usable for user authentication.

In some aspects, the automotive computer 104 may connect with an infotainment system 142 or a vehicle Human-Machine Interface (HMI). The infotainment system 142 may include a touchscreen interface portion and may include voice recognition features, biometric identification capabilities that may identify users based on facial recognition, voice recognition, fingerprint identification, or other biological identification means. In other aspects, the infotainment system 142 may be further configured to receive user instructions via the touchscreen interface portion and/or output or display notifications, navigation maps, etc. on the touchscreen interface portion.

The computing system architecture of the vehicle 100 may omit certain computing modules. It should be readily understood that the computing environment depicted in FIG. 1 is an example of a possible implementation according to the present disclosure, and thus, it should not be considered as limiting or exclusive.

Figure 2:
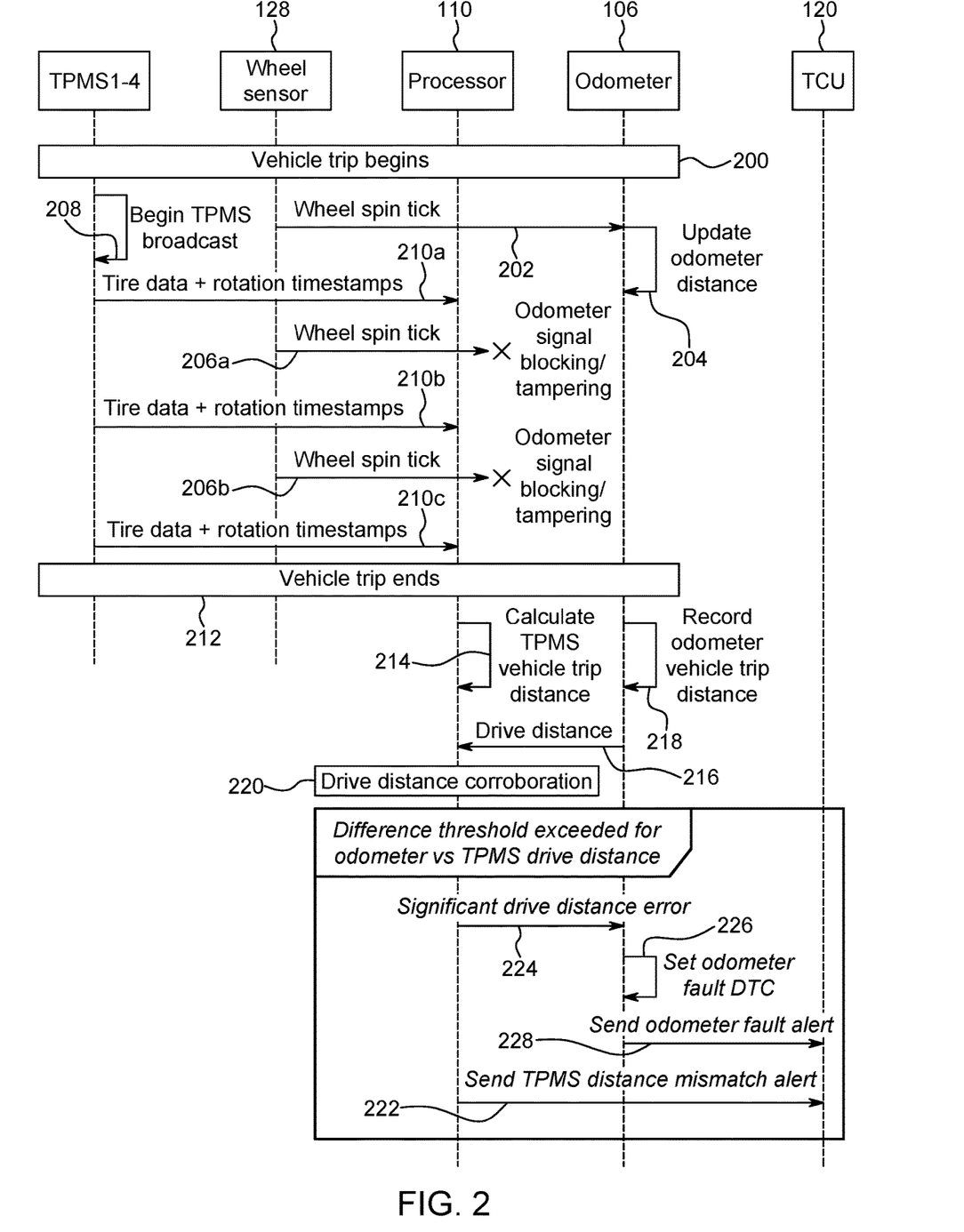
FIG. 2 depicts an example signal diagram associated with a vehicle in accordance with the present disclosure.

In operation, when a vehicle trip begins (as shown in FIG. 2 as an event 200), the odometer 106 may start to receive wheel spin data or wheel spin ticks (or "first inputs") associated with each tire T1-T4 from the wheel sensor 128 (or a "first sensor"), as shown in FIG. 2 as an event 202. As the odometer 106 receives the wheel spin data from the wheel sensor 128, the odometer 106 may translate the received data into a distance travelled by the tires T1-T4 (and hence the vehicle 100) and accrue into a total mileage travelled by the vehicle 100 in the vehicle trip. The odometer 106 may further update the odometer reading with the distance travelled, as shown in FIG. 2 as an event 204.

A person ordinarily skilled in the art may appreciate that to spoof the odometer reading or to make the odometer 106 output/display an incorrect or reduced mileage, a malicious user (e.g., a vehicle owner) may block the wheel spin data or wheel spin ticks (or the first inputs) associated with the tires T1-T4 from reaching to the odometer 106, as shown in FIG. 2 as events 206a, 206b. When the wheel spin data does not reach the odometer 106, the odometer 106 may perceive that the tires T1-T4 may not be moving and may hence not increase/accrue mileage in the vehicle trip. This may result in the odometer 106 outputting incorrect/reduced mileage, which, over time, may be used by the malicious user to unfairly enhance vehicle's value and/or to show to the potential vehicle buyers, financial institutions, the operator 138, etc., that the vehicle 100 has travelled less distance than the distance the vehicle 100 may have actually travelled.

To detect such odometer reading manipulation, the processor 110 (or the BCM 114) may be configured to obtain the same wheel spin data or wheel spin ticks (or the first inputs) associated with each tire T1-T4 from the wheel sensor 128, which the odometer 106 receives. In some aspects, the processor 110 may use the wheel spin data to track a total count of wheel spin ticks and a current rate of wheel spin accrual over a predefined short time duration. Responsive to obtaining the wheel spin data (and tracking the count of wheel spin ticks and the rate of wheel spin accrual), the processor 110 may estimate a first distance travelled by each tire T1-T4 for the predefined short time duration (e.g., 3 to 10 seconds) in the vehicle trip based on the obtained wheel spin data. In this case, the processor 110 may estimate the distance (e.g., the first distance) travelled by each tire T1-T4 every 3 to 10 seconds, so that the first distance is estimated regularly/frequently at relatively short travel time durations.

In addition, when the vehicle trip begins, each TPMS1-4 (or "second sensor") may begin to measure the vehicle wheel/tire rotation data and the vehicle wheel/tire spin/rotation timestamp data (or "second inputs") associated with the corresponding tire T1-T4, and broadcast/transmit the second inputs to the processor 110, as shown in FIG. 2 as an event 208. The processor 110 may obtain the second inputs from one or more TPMSs1-4, and may determine the corresponding tire T1-T4 for which the second inputs may have been obtained.

In some aspects, during the auto-learning phase of new TPMSs1-4 in the vehicle 100, the processor 110 may compare the inputs obtained from the TPMSs1-4 with the inputs obtained from the wheel sensor 128, and may reliably identify which TPMS is associated with which tire based on the comparison. For example, based on the comparison of inputs, the processor 110 may identify that the TPMS1 may be associated with the tire T1, and hence the inputs (e.g., the second inputs) obtained from the TPMS1 in the future may correspond to the vehicle wheel rotation data and the vehicle wheel spin timestamp data for the tire T1. In a similar manner, the processor 110 may identify that the TPMS2 may be associated with the tire T2, the TPMS3 may be associated with the tire T3, and the TPMS4 may be associated with the tire T4. The processor 110 may use this "learning" to determine the tire T1-T4 for which the processor 110 may have obtained the second inputs when the vehicle 100 may be travelling in the vehicle trip.

Responsive to obtaining the second inputs from one or more TPMSs1-4 during the vehicle trip, the processor 110 may first determine whether the processor 110 has obtained the second inputs from more than or less than a minimum count of TPMSs (one or two). For example, responsive to obtaining the second inputs, the processor 110 may determine whether at least two TPMSs (from the TPMSs1-4) may have transmitted their second inputs to the processor 110. The processor 110 may output a first error notification when the processor 110 may be unable to obtain the second inputs from any TPMS (from the TPMSs1-4) or obtains the second inputs from less than two TPMSs (from the TPMSs1-4). In addition, the processor 110 may set a Diagnostic Trouble Code (DTC) in the processor 110/BCM 114, when the processor may be unable to obtain the second inputs from any TPMS or obtains the second inputs from less than two TPMSs. In some aspects, the processor 110 may not obtain the second inputs from one or more TPMSs when the corresponding TPMSs may be faulty/malfunctioning, and/or communication pairing between the processor 110 and the corresponding TPMSs may have been interrupted.

The processor 110 may output, via the TCU 120, the first error notification to the server 136 and/or the user device 134. In further aspects, the processor 110 may output the first error notification to the infotainment system 142. The first error notification may indicate to the operator 138, the vehicle OEM, etc., that one or more TPMSs may be faulty/malfunctioning, and hence the processor 110 may not be able to confirm whether the odometer reading may be accurate or inaccurate.

On the other hand, when the processor 110 determines that the processor 110 has obtained the second inputs from more than the minimum count of TPMSs, the processor 110 may continue to receive the second inputs from the corresponding TPMSs (e.g., the TPMSs1-4), without outputting the first error notification, as shown in FIG. 2 as events 210a, 210b, 210c. Responsive to obtaining the second inputs from the TPMSs1-4, the processor 110 may estimate a second distance travelled by each tire T1-T4 for the same predefined short time duration (e.g., 3 to 10 seconds) in the vehicle trip based on the obtained second inputs. For example, the processor 110 may estimate a distance travelled by the tire T1 based on the inputs obtained from the TPMS1, a distance travelled by the tire T2 based on the inputs obtained from the TPMS2, and so on.

In some aspects, the processor 110 may apply one or more smoothing functions on the second inputs obtained from the TPMSs1-4 and/or the estimated second distances, to remove outlier values from the mileage/distance estimates (e.g., if potholes or vehicle movement on rough roads are incorrectly detected as additional wheel rotations by the TPMSs1-4). Furthermore, in an exemplary aspect, while estimating the second distance in the predefined short time duration, the processor 110 may use the most recent subset of second inputs to calculate a partial instant mileage estimate for each tire T1-T4. The summation of each of these partial instant mileage estimates may be approximately equal to the total mileage estimate traveled during the vehicle trip after averaging all tire data together.

Responsive to estimating the first distance for each tire T1-T4 based on the inputs (e.g., the first inputs) obtained from the wheel sensor 128 over the predefined short time duration and the second distance for each tire T1-T4 based on the inputs (e.g., the second inputs) obtained from the TPMSs1-4 over the same predefined short time duration, the processor 110 may compare the pair of estimated first distance and second distance for each tire T1-T4. Based on the comparison, the processor 110 may calculate a difference (e.g., a first difference) between the second distance and the first distance for each tire T1-T4. The processor 110 may perform a predefined action when the calculated first difference may be greater than a first predefined threshold (that may be pre-stored in the memory 112).

In some aspects, the predefined action may include increasing a count of mileage error instances (that may be stored in the memory 112) on the vehicle trip by one count. In this case, the memory 112 may be configured to maintain/store a count of mileage error instances that the processor 110 identifies on a vehicle trip. Whenever the processor 110 determines that the difference between the estimated first distance and the estimated second distance for a vehicle tire (from the tires T1-T4) may be greater than the first predefined threshold during the vehicle trip, the processor 110 may increase the count of mileage error instances stored in the memory 112 by one or by one "mileage error instance unit". For example, when the processor 110 determines that the difference between the estimated first distance and the estimated second distance for a vehicle tire (e.g., the tire T1) may be greater than the first predefined threshold for a first time during the vehicle trip, the processor 110 may increase the count from 0 to 1. Thereafter, when the processor 110 determines that the difference between the estimated first distance and the estimated second distance for a vehicle tire (e.g., the tire T1 or any other tire from the tires T2-T4) may be greater than the first predefined threshold for a second time during the vehicle trip, the processor 110 may increase the count from 1 to 2, and so on.

Furthermore, the processor 110 may be configured to determine (or maintain a track of) a time duration elapsed in the vehicle trip (e.g., via inputs obtained from a vehicle timer, not shown), responsive to increasing the count of mileage error instances by one mileage error instance unit. The processor 110 may further calculate a ratio of the count of mileage error instances with the determined time duration and compare the ratio with a second predefined threshold (that may be pre-stored in the memory 112). The processor 110 may output a second error notification when the processor 110 determines that the ratio may be greater than the second predefined threshold. In addition, the processor 110 may set a DTC in the processor 110/BCM 114 when the processor 110 determines that the ratio may be greater than the second predefined threshold. The processor 110 may output, via the TCU 120, the second error notification to the server 136 and/or the user device 134. The second error notification and/or the DTC may indicate to the operator 138, the vehicle OEM, etc., that the odometer reading may not be accurate and the odometer reading may be spoofed. In this manner, the vehicle 100 facilitates the operator 138, the vehicle OEM, etc. to know about potential odometer reading fraud, and take appropriate actions.

In some aspects, the second predefined threshold may be set to a value high enough to prevent false positives (since the second distance estimate may have changing variance from the actual distance traveled by the vehicle 100) but low enough to still detect a target amount of intentional odometer fraud/spoofing.

The vehicle 100 may implement an additional layer of odometer fraud detection over and above the process described above. As the additional layer of odometer fraud detection, the processor 110 may first determine that the vehicle trip may have ended, as shown in FIG. 2 as an event 212. In some aspects, the processor 110 may determine that the vehicle trip may have ended when a vehicle engine may be switched off, the vehicle 100 may be stationary for more than a predefined stationary time duration, and/or the vehicle 100 may be put in park mode. Responsive to determining that the vehicle trip may have ended, the processor 110 may estimate/calculate a second total distance (or "TPMS vehicle trip distance") travelled by each tire T1-T4 on the vehicle trip based on the second inputs obtained from the TPMSs1-4 over the entire vehicle trip, as shown in FIG. 2 as an event 214. In some aspects, the processor 110 may estimate the second total distance by adding a plurality of "second distances" or the partial instant mileage estimates that the processor 110 may have calculated throughout the vehicle trip for each tire T1-T4 based on the second inputs obtained from the TPMSs1-4. In some aspects, the processor 110 may average the second total distances for the four tires T1-T4 to calculate a "single" second total distance value associated with the vehicle trip for the vehicle 100.

Responsive to calculating the second total distance as described above, the processor 110 may obtain a first total distance value (or "drive distance", as shown in FIG. 2 as an event 216) travelled by each tire T1-T4 or the vehicle 100 on the vehicle trip from the odometer 106, which may have been measured/determined by the odometer 106 throughout the vehicle trip (as shown in FIG. 2 as an event 218) based on the first inputs obtained from the wheel sensor 128. The processor 110 may then perform a drive distance corroboration, as shown in FIG. 2 as an event 220. Specifically, responsive to calculating the second total distance and obtaining the first total distance, the processor 110 may compare the first and second total distances and determine a second difference between the second total distance and the first total distance.

The processor 110 may output a third error notification (as shown in FIG. 2 as an event 222) when the second difference may be greater than a third predefined threshold (as shown in FIG. 2 as an event 224). Stated another way, the processor 110 may output the third error notification (or "TPMS distance mismatch alert") when the processor 110 determines a significant drive distance error or difference between the second and first total distances estimated based on the inputs obtained from the TPMSs1-4 and the wheel sensor 128. In some aspects, the processor 110 may output, via the TCU 120, the third error notification to the server 136 and/or the user device 134 to indicate to the operator 138, the vehicle OEM, etc. that the odometer reading may be inaccurate. The processor 110 may further set a fault DTC in the BCM 114 and/or the odometer 106 (as shown in FIG. 2 as an event 226), in addition to outputting the third error notification. The odometer 106 may also transmit an odometer fault alert to the TCU 120, as shown in FIG. 2 as an event 228.

Similar to the second predefined threshold, the third predefined threshold may also be set to a value high enough to prevent false positives, but low enough to still detect a target amount of intentional odometer fraud/spoofing.

In this manner, the vehicle 100 facilitates in efficiently detecting and alerting odometer fraud/spoofing.

A person ordinarily skilled in the art may appreciate that one possible approach to mitigating odometer fraud may be to add message authentication to the first inputs provided by the vehicle's ABS module/wheel sensor 128. While this would prevent spoofing any data/inputs sent by the wheel sensor 128, it does not address the concern of someone selectively blocking the wheel spin data/first inputs to cause the odometer 106 to record less miles than actually driven. Furthermore, storing a duplicated odometer value within the ABS module/wheel sensor 128 may increase complexity during module swaps where the ABS' mileage will be different from the odometer's value and could cause malicious users to simply tamper wheel speed sensors directly instead of the first inputs provided by the ABS module/wheel sensor 128 to hide a vehicle's true mileage.

With the process disclosed in the present disclosure, several vehicle features (TPMSs1-4, the wheel sensor 128, traction control, etc.) and different communication channels (CAN, Ethernet, low-frequency, BLE, etc.) must be interrupted or fully disabled before the mileage fraud becomes possible, making tampering much more difficult. Additionally, tracking the count of times the TPMS-wheel sensor corroboration could not be performed may provide vehicle buyers with a sufficient prompt to perform further investigations into the vehicle's true mileage (e.g., request service records from the vehicle's current owner, check total engine run time recorded by powertrain ECUs or battery charge cycles from a battery management controller, etc.).

The vehicle 100 implements and/or performs operations, as described here in the present disclosure, in accordance with the owner manual and safety guidelines. In addition, any action taken by the operator 138 based on notifications provided by the vehicle 100 should comply with all the rules specific to the location and operation of the vehicle 100 (e.g., Federal, state, country, city, etc.). The notifications, as provided by the vehicle 100, should be treated as suggestions and only followed according to any rules specific to the location and operation of the vehicle 100.

Figure 3A:
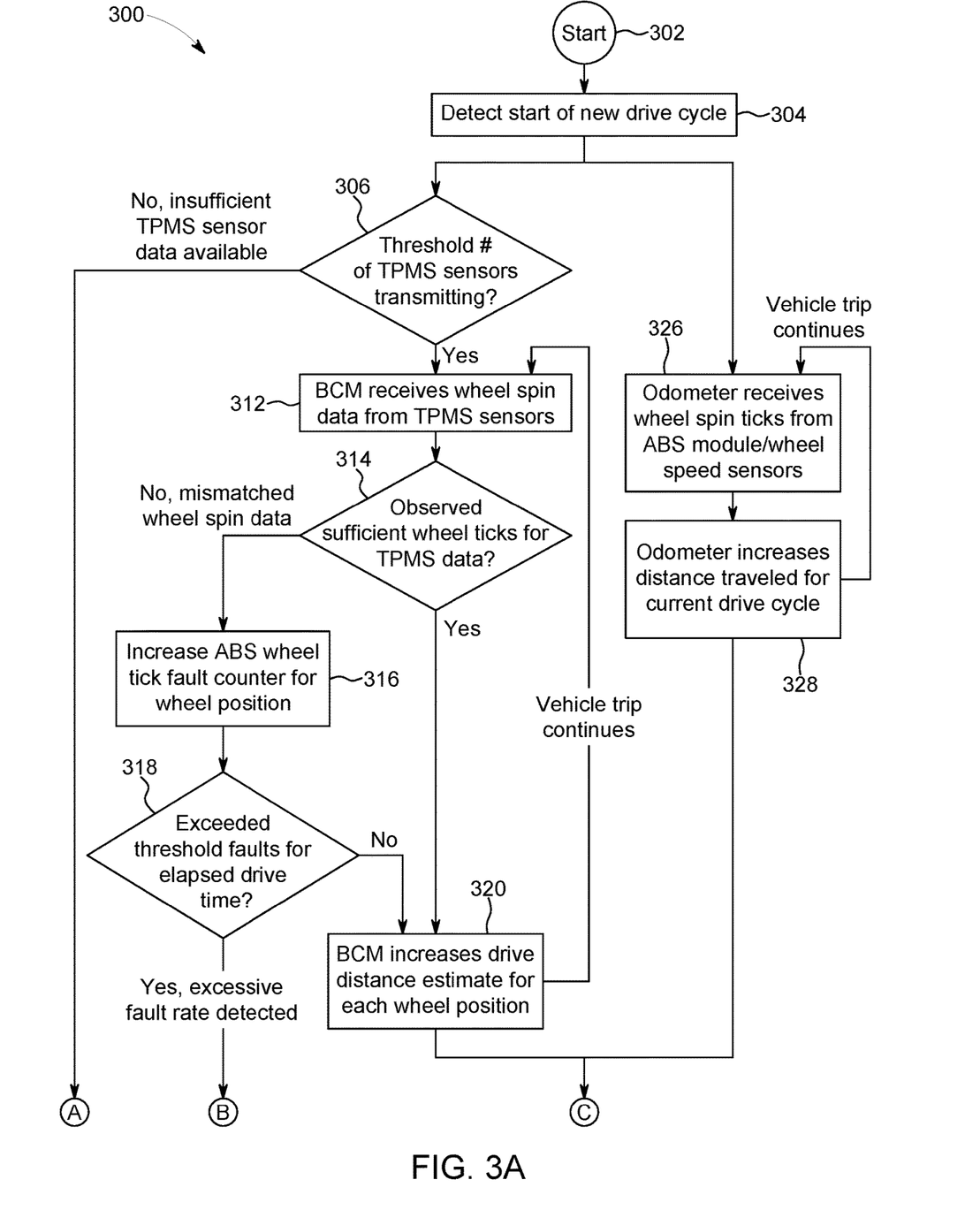
FIGS. 3A and 3B depict a flow diagram of a method for detecting error in odometer reading in accordance with the present disclosure.
Figure 3B:
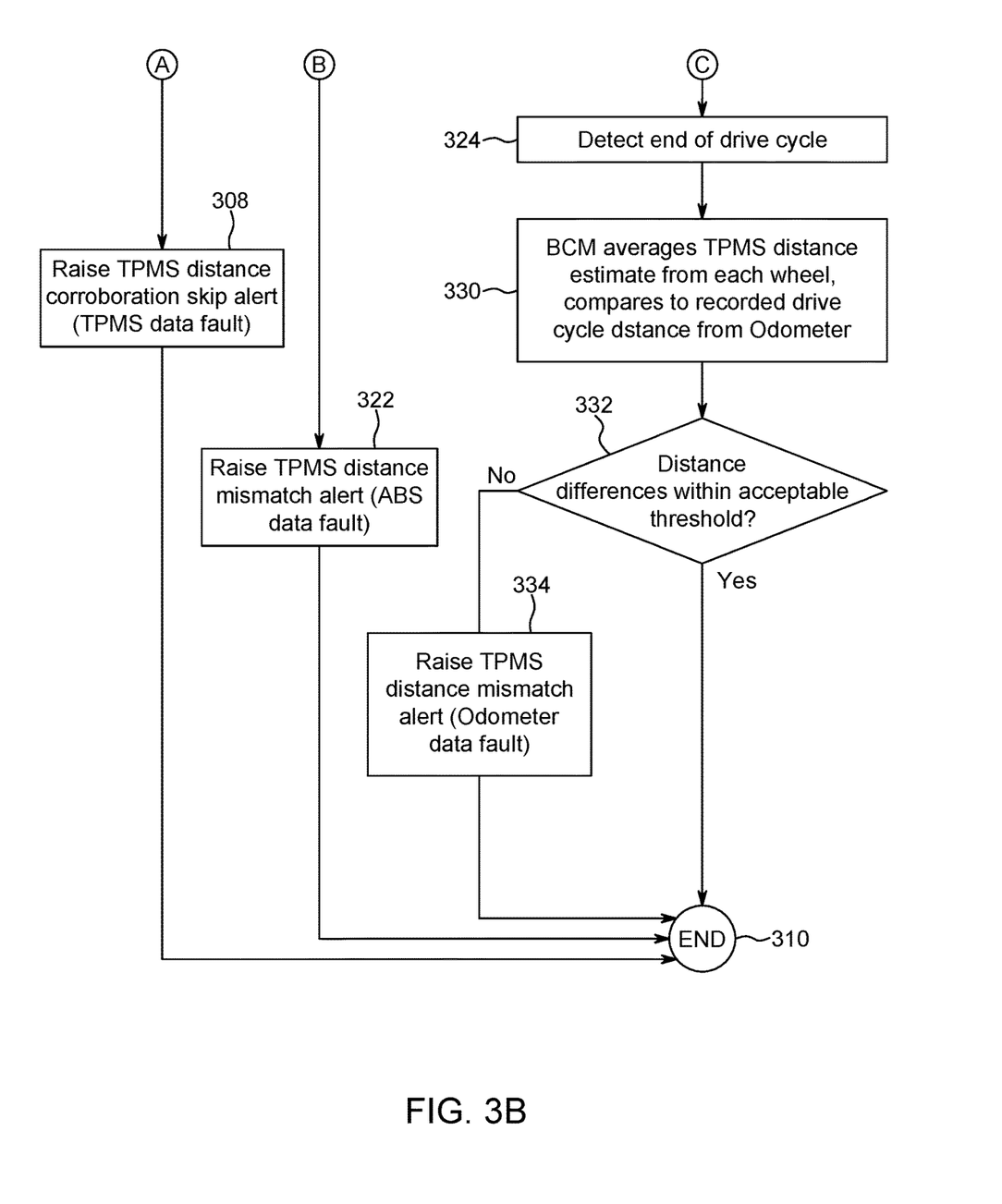

FIGS. 3A and 3B depict a flow diagram of a method 300 for detecting error in odometer reading in accordance with the present disclosure. FIGS. 3A and 3B may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 300 starts at step 302. At step 304, the method 300 may include detecting, by the processor 110/BCM 114, that the vehicle trip may have started or a new "drive cycle" may have started. At this point, the processor 110 may start to receive the second inputs from one or more TPMSs1-4. At step 306, the method 300 may include determining, by the processor 110, whether a threshold or minimum count of TPMSs1-4 may be transmitting the second inputs to the processor 110. If less than the minimum count of TPMSs1-4 may be transmitting the second inputs to the processor 110, then at step 308, the processor 110 may raise a TPMS distance corroboration skip alert or a TPMS data fault alert or output the first error notification, as described above in conjunction with FIGS. 1 and 2. The method 300 may then proceed to step 310, at which the method 300 may end.

On the other hand, if the processor 110 determines at the step 306 that more than the minimum count of TPMSs1-4 may be transmitting the second inputs to the processor 110, the method 300 may move to step 312. At the step 312, the method 300 may include receiving, by the processor 110/BCM 114, the wheel spin data or the second inputs from the TPMSs1-4. At step 314, the method 300 may include determining, by the processor 110, whether sufficient count of wheel ticks may be observed or obtained from the wheel sensor 128 relative to the second inputs obtained from the TPMSs1-4. Stated another way, at the step 314, the processor 110 may determine whether the first difference between the second distance and the first distance for each tire T1-T4 may be greater than the first predefined threshold, as described above in conjunction with FIGS. 1 and 2.

Responsive to determining that sufficient wheel ticks are not observed relative to the second inputs obtained from the TPMSs1-4 or the first difference may be greater than the first predefined threshold, the method 300 may move to step 316. At the step 316, the method 300 may include increasing, by the processor 110/BCM 114, an ABS wheel tick fault counter for the particular wheel position or the count of mileage error instances by one count/unit. At step 318, the method 300 may include determining, by the processor 110/BCM 114, whether the count of faults has exceeded a threshold value for the elapsed time duration in the vehicle trip or the ratio of the count of faults with the elapsed time duration may be greater than the second predefined threshold, as described above in conjunction with FIGS. 1 and 2.

The method 300 may move to step 320 if the processor 110 determines at the step 318 that the ratio may be less than the second predefined threshold. The method 300 may additionally move to the step 320 from the step 314 when the processor 110 determines at the step 314 that sufficient wheel ticks may be observed relative to the second inputs obtained from the TPMSs1-4. At the step 320, the method 300 may include increasing, by the processor 110/BCM 114, the drive or travel distance estimate (or "second distance") for each tire T1-T4 or wheel position based on the second inputs. The method 300 moves back to the step 312 from the step 320 as the vehicle trip continues.

On the other hand, if the processor 110 determines at the step 318 that the ratio may be greater than the second predefined threshold or the count of faults has exceeded the threshold value for the elapsed time duration in the vehicle trip, the method 300 may move to step 322. At the step 322, the method 300 may include raising, by the processor 110/BCM 114, a TPMS distance mismatch alert or an ABS data fault alert or outputting the second error notification, as described above in conjunction with FIGS. 1 and 2. The method 300 may move to the step 310 after the step 322.

The method 300 may further include a step 324 of detecting, by the processor 110/BCM 114, that the vehicle trip may have ended or an end of a drive cycle. At this step, the processor 110 may obtain the first total distance that the odometer 106 may have determined based on the first inputs obtained from the wheel sensor 128. As shown in FIG. 3 at a step 326, the odometer 106 may continuously receive wheel spin ticks or the first inputs from the wheel sensor 128 when the vehicle 100 may be moving on the vehicle trip, and may increase/update the distance (e.g., the first total distance) travelled by the vehicle 100 in the vehicle trip or the current drive cycle based on the received first inputs (shown as a step 328 in FIG. 3).

At step 330, the method 300 may include averaging, by the processor 110/BCM 114, the TPMS distance estimate for each wheel/tire T1-T4 or estimating the second total distance travelled by the vehicle 100 based on the second inputs obtained from the TPMSs1-4 on the entire vehicle trip. The step 330 may further include comparing the first total distance with the second total distance.

At step 332, the method 300 may include determining, by the processor 110/BCM 114, whether the second difference between the second total distance and the first total distance is less than the third predefined threshold. The method 300 may move to the step 310 if the processor 110 determines at the step 332 that the second difference may be less than the third predefined threshold. On the other hand, the method 300 may move to step 334 if the processor 110 determines at the step 332 that the second difference may be greater than the third predefined threshold. At the step 334, the method 300 may include raising, by the processor 110, a TPMS distance mismatch alert or an odometer data fault alert or outputting the third error notification, as described above in conjunction with FIGS. 1 and 2.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
   a first sensor configured to measure first inputs associated with a vehicle wheel;
   a second sensor configured to measure second inputs associated with the vehicle wheel;
   a memory configured to store a count of mileage error instances on the vehicle trip; and
   a processor communicatively coupled with the first sensor and the second sensor, wherein the processor is configured to:
      estimate a first distance travelled by the vehicle wheel for a predefined time duration on a vehicle trip based on the first inputs;
      estimate a second distance travelled by the vehicle wheel for the predefined time duration on the vehicle trip based on the second inputs;
      calculate a first difference between the second distance and the first distance; and
      perform a predefined action when the first difference is greater than a first predefined threshold,
   wherein the predefined action comprises increasing the count of mileage error instances by one mileage error instance unit when the first difference is greater than the first predefined threshold.

2. The vehicle of claim 1, wherein the first sensor is a vehicle wheel speed sensor.

3. The vehicle of claim 2, wherein the first inputs comprise wheel spin data.

4. The vehicle of claim 1, wherein the second sensor is a Tire Pressure Monitoring System (TPMS) sensor.

5. The vehicle of claim 4, wherein the second inputs comprise at least one of a vehicle wheel rotation data and a vehicle wheel spin timestamp data.

6. The vehicle of claim 1, wherein the processor is further configured to:
   determine a time duration elapsed in the vehicle trip, responsive to increasing the count of mileage error instances by one mileage error instance unit;
   calculate a ratio of the count of mileage error instances with the time duration;
   determine that the ratio is greater than a second predefined threshold; and
   output a first error notification responsive to determining that the ratio is greater than the second predefined threshold.

7. The vehicle of claim 1, wherein the processor is further configured to:
   detect that the vehicle trip has ended; and
   estimate a second total distance travelled by the vehicle wheel on the vehicle trip based on the second inputs, responsive to detecting that the vehicle trip has ended.

8. The vehicle of claim 7 further comprising an odometer configured to determine a first total distance travelled by the vehicle wheel on the vehicle trip based on the first inputs, wherein the processor is configured to:
   determine a second difference between the second total distance and the first total distance; and
   output a second error notification when the second difference is greater than a third predefined threshold.

9. The vehicle of claim 7, wherein the processor detects that the vehicle trip has ended when a vehicle engine is switched off or the vehicle is stationary for more than a predefined stationary time duration.

10. The vehicle of claim 1, wherein the processor is further configured to output a third error notification when the processor is unable to obtain the second inputs from the second sensor.

11. A method comprising:
    estimating, by a processor, a first distance travelled by a vehicle wheel associated with a vehicle for a predefined time duration on a vehicle trip, based on first inputs associated with the vehicle wheel measured by a first sensor;
    estimating, by the processor, a second distance travelled by the vehicle wheel for the predefined time duration on the vehicle trip, based on second inputs associated with the vehicle wheel measured by a second sensor;
    calculating, by the processor, a first difference between the second distance and the first distance;
    performing, by the processor, a predefined action when the first difference is greater than a first predefined threshold; and
    storing a count of mileage error instances on the vehicle trip in a memory, and wherein the predefined action comprises increasing the count of mileage error instances by one mileage error instance unit when the first difference is greater than the first predefined threshold.

12. The method of claim 11, wherein the first sensor is a vehicle wheel speed sensor, and wherein the first inputs comprise wheel spin data.

13. The method of claim 11, wherein the second sensor is a Tire Pressure Monitoring System (TPMS) sensor, and wherein the second inputs comprise at least one of a vehicle wheel rotation data and a vehicle wheel spin timestamp data.

14. The method of claim 11 further comprising:
    determining a time duration elapsed in the vehicle trip, responsive to increasing the count of mileage error instances by one mileage error instance unit;
    calculating a ratio of the count of mileage error instances with the time duration;
    determining that the ratio is greater than a second predefined threshold; and
    outputting a first error notification responsive to determining that the ratio is greater than the second predefined threshold.

15. The method of claim 11 further comprising:
    detecting that the vehicle trip has ended; and
    estimating a second total distance travelled by the vehicle wheel on the vehicle trip based on the second inputs, responsive to detecting that the vehicle trip has ended.

16. The method of claim 15 further comprising:
    determining a second difference between the second total distance and a first total distance travelled by the vehicle wheel on the vehicle trip, wherein the first total distance is determined by an odometer based on the first inputs; and outputting a second error notification when the second difference is greater than a third predefined threshold.

17. The method of claim 11 further comprising outputting a third error notification when the second inputs are not obtained from the second sensor.

18. A vehicle comprising:
a first sensor configured to measure first inputs associated with a vehicle wheel;
a second sensor configured to measure second inputs associated with the vehicle wheel;
an odometer configured to determine a first total distance travelled by the vehicle wheel on the vehicle trip based on the first inputs; and
a processor communicatively coupled with the first sensor and the second sensor, wherein the processor is configured to:
estimate a first distance travelled by the vehicle wheel for a predefined time duration on a vehicle trip based on the first inputs;
estimate a second distance travelled by the vehicle wheel for the predefined time duration on the vehicle trip based on the second inputs;
calculate a first difference between the second distance and the first distance; and
perform a predefined action when the first difference is greater than a first predefined threshold;
detect that the vehicle trip has ended;
estimate a second total distance travelled by the vehicle wheel on the vehicle trip based on the second inputs, responsive to detecting that the vehicle trip has ended;
determine a second difference between the second total distance and the first total distance; and
output a second error notification when the second difference is greater than a third predefined threshold.

19. A vehicle comprising:
a first sensor configured to measure first inputs associated with a vehicle wheel;
a second sensor configured to measure second inputs associated with the vehicle wheel; and
a processor communicatively coupled with the first sensor and the second sensor, wherein the processor is configured to:
estimate a first distance travelled by the vehicle wheel for a predefined time duration on a vehicle trip based on the first inputs;
estimate a second distance travelled by the vehicle wheel for the predefined time duration on the vehicle trip based on the second inputs;
calculate a first difference between the second distance and the first distance;
perform a predefined action when the first difference is greater than a first predefined threshold;
detect that the vehicle trip has ended; and
estimate a second total distance travelled by the vehicle wheel on the vehicle trip based on the second inputs, responsive to detecting that the vehicle trip has ended,
wherein the processor detects that the vehicle trip has ended when a vehicle engine is switched off or the vehicle is stationary for more than a predefined stationary time duration.

* * * * *